(12) United States Patent
Dillenberger et al.

(10) Patent No.: US 8,386,930 B2
(45) Date of Patent: Feb. 26, 2013

(54) CONTEXTUAL DATA CENTER MANAGEMENT UTILIZING A VIRTUAL ENVIRONMENT

(75) Inventors: Donna N. Dillenberger, Hawthorne, NY (US); Rick A. Hamilton, II, Richmond, VA (US); Neal M. Keller, Yorktown Heights, NY (US); Brian M. O'Connell, Research Triangle Park, NC (US); Clifford A. Pickover, Yorktown Heights, NY (US); Keith R. Walker, Austin, TX (US); Alexander Zlatsin, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 441 days.

(21) Appl. No.: 12/478,982

(22) Filed: Jun. 5, 2009

(65) Prior Publication Data

US 2010/0313145 A1   Dec. 9, 2010

(51) Int. Cl.
*G06F 3/048* (2006.01)
(52) U.S. Cl. .................................. 715/706; 715/757
(58) Field of Classification Search .................. 715/757, 715/706
See application file for complete search history.

(56) References Cited

U.S. PATENT DOCUMENTS

| | | | |
|---|---|---|---|
| 6,628,307 B1 | 9/2003 | Fair | |
| 6,643,639 B2 | 11/2003 | Biebesheimer et al. | |
| 6,693,651 B2 | 2/2004 | Biebesheimer et al. | |
| 6,701,311 B2 | 3/2004 | Biebesheimer et al. | |
| 6,711,699 B1 | 3/2004 | Kanevsky et al. | |
| 6,778,193 B2 | 8/2004 | Biebesheimer et al. | |
| 6,785,676 B2 | 8/2004 | Oblinger | |
| 6,809,738 B2 | 10/2004 | Hubrecht et al. | |
| 6,853,998 B2 | 2/2005 | Biebesheimer et al. | |
| 6,873,990 B2 | 3/2005 | Oblinger | |
| 7,171,470 B2 | 1/2007 | Doyle et al. | |
| 7,197,193 B2 | 3/2007 | Li et al. | |
| 7,673,044 B2 * | 3/2010 | Miyake | 715/273 |
| 2002/0013837 A1 * | 1/2002 | Battat et al. | 709/223 |
| 2002/0134985 A1 | 9/2002 | Chen et al. | |
| 2003/0156134 A1 * | 8/2003 | Kim | 345/753 |

(Continued)

OTHER PUBLICATIONS

Foster, "A Globus Primer or, Everything You Wanted to Know about Globus, but Were Afraid to Ask," Draft of May 8, 2005, printed from http://www.globus.org/toolkit/docs/4.0/key/GT4_Primer_0.6.pdf on May 10, 2007, publication date unknown, pp. 1-69.

(Continued)

*Primary Examiner* — Weilun Lo
*Assistant Examiner* — Truc Chuong
(74) *Attorney, Agent, or Firm* — William E. Schiesser; Hoffman Warnick LLC (57) ABSTRACT

Contextual data center management utilizing a virtual environment is described. In one embodiment, there is a data center management tool for managing a physical data center from a representation of the physical data center operating in a virtual universe. The data center management tool includes a data center contextual object component configured to obtain a data center contextual object that describes operational information of the physical data center in the virtual universe. An operational change component is configured to implement at least one operational change to the representation of the physical data center in the virtual universe. The at least one operational change is implemented as a function of the data center contextual object. A management component is configured to manage the physical data center pursuant to a result obtained from implementing the at least one operational change.

21 Claims, 5 Drawing Sheets

U.S. PATENT DOCUMENTS

| | | |
|---|---|---|
| 2004/0120021 A1 | 6/2004 | Kihara et al. |
| 2005/0052714 A1 | 3/2005 | Klug et al. |
| 2005/0162721 A1 | 7/2005 | Kihara et al. |
| 2006/0031849 A1 | 2/2006 | Barta et al. |
| 2006/0123393 A1 | 6/2006 | Atkins et al. |
| 2006/0136829 A1 | 6/2006 | Abbar et al. |
| 2006/0149842 A1 | 7/2006 | Dawson et al. |
| 2006/0150158 A1 | 7/2006 | Fellenstein et al. |
| 2006/0248159 A1 | 11/2006 | Polan |
| 2007/0027973 A1 | 2/2007 | Stein et al. |
| 2007/0067435 A1 | 3/2007 | Landis et al. |
| 2009/0100353 A1* | 4/2009 | Cradick et al. ............... 715/757 |
| 2009/0113066 A1* | 4/2009 | Van Wie et al. ............... 709/231 |
| 2010/0161368 A1* | 6/2010 | Dawson et al. ............... 705/8 |

OTHER PUBLICATIONS

Kaufman et al., "OptimalGrid: The Almaden SmartGrid Project—Autonomous Optimization of Distributed Computing on the Grid," IEEE Technical Committee on Scalable Computing Newsletters, vol. 4, No. 2, 2002, pp. 1-10.

Kaufman et al., "OptimalGrid—Autonomic Computing on the Grid," IBM Developer Works, Jun. 2003, pp. 1-10.

* cited by examiner

CONTEXTUAL DATA CENTER MANAGEMENT UTILIZING A VIRTUAL ENVIRONMENT

FIELD OF THE INVENTION

This invention relates generally to data center management, and more specifically to managing a data center from a virtual universe using data center context.

BACKGROUND OF THE INVENTION

Virtual universes or virtual worlds are computer-based simulated environments intended for its users to inhabit and interact via avatars, which are personas or representations of the users of the virtual universes and generally take the form of two-dimensional or three-dimensional human or fantastical representations of a person's self. These types of virtual universes are now most common in massive multiplayer online games, such as Second Life, which is a trademark of Linden Research in the United States, other countries or both.

In addition to providing a wide range of social experiences, these virtual universes also have unlimited potential for business applications. For example, virtual universes have been used to model the operation of data centers. Although the use of a virtual universe to model the operation of data centers shows promise in managing these data centers, there are still plenty of opportunities to improve upon currently employed techniques.

SUMMARY OF THE INVENTION

In one embodiment, there is a method for managing a physical data center from a representation of the physical data center operating in a virtual universe. In this embodiment, the method comprises: obtaining a data center contextual object that describes operational information of the physical data center in the virtual universe; implementing at least one operational change to the representation of the physical data center in the virtual universe, wherein the at least one operational change is implemented as a function of the data center contextual object; and managing the physical data center pursuant to a result obtained from implementing the at least one operational change to the representation of the physical data center in the virtual universe.

In a second embodiment, there is a computer system for managing a physical data center from a representation of the physical data center operating in a virtual universe. In this embodiment, the system comprises at least one processing unit and memory operably associated with the at least one processing unit. A data center management tool is storable in memory and executable by the at least one processing unit. The tool comprises a data center contextual object component configured to obtain a data center contextual object that describes operational information of the physical data center in the virtual universe. An operational change component is configured to implement at least one operational change to the representation of the physical data center in the virtual universe, wherein the at least one operational change is implemented as a function of the data center contextual object. A management component is configured to manage the physical data center pursuant to a result obtained from implementing the at least one operational change to the representation of the physical data center in the virtual universe.

In a third embodiment, there is a computer-readable medium storing computer instructions, which when executed, enables a computer system to manage a physical data center from a representation of the physical data center operating in a virtual universe. In this embodiment, the computer instructions comprises: obtaining a data center contextual object that describes operational information of the physical data center in the virtual universe; implementing at least one operational change to the representation of the physical data center in the virtual universe, wherein the at least one operational change is implemented as a function of the data center contextual object; and managing the physical data center pursuant to a result obtained from implementing the at least one operational change to the representation of the physical data center in the virtual universe.

In a fourth embodiment, there is a method for providing a data center management tool as a service within a virtual universe for facilitating management of a physical data center from a representation of the physical data center operating in the virtual universe. In this embodiment, the method comprises deploying the data center management tool in a computer system as a service for facilitating management of the physical data center from the virtual universe. The data center management tool is operable to: obtain a data center contextual object that describes operational information of the physical data center in the virtual universe; implement at least one operational change to the representation of the physical data center in the virtual universe, wherein the at least one operational change is implemented as a function of the data center contextual object; manage the physical data center pursuant to a result obtained from implementing the at least one operational change to the representation of the physical data center in the virtual universe; and charge a management fee to an owner of the physical data center.

In a fifth embodiment, there is a method for deploying a data center management tool for use in a computer system that manages a physical data center from a representation of the physical data center operating in a virtual universe. In this embodiment, a computer infrastructure is provided and is operable to: obtain a data center contextual object that describes operational information of the physical data center in the virtual universe; implement at least one operational change to the representation of the physical data center in the virtual universe, wherein the at least one operational change is implemented as a function of the data center contextual object; and manage the physical data center pursuant to a result obtained from implementing the at least one operational change to the representation of the physical data center in the virtual universe.

DETAILED DESCRIPTION OF THE INVENTION

Embodiments of this invention are directed to a technique for managing a physical data center from a representation of that physical data center as it operates in a virtual universe. Using a virtual universe to model a data center is useful for a number of reasons. In particular, a virtual universe can create an easy-to-access and easy-to-visualize approach to interacting with an actual data center by service personnel who may not be physically close to the actual data center, but whom have seen and studied actual data centers with tape drives, disk drives, cooling units, and similar components. Also, a three-dimensional representation that models some or all of the actual data center layout can be useful to remind service personnel as to interactions between components and as an operational aide. This may be useful with problems concerning heat, cooling, access to panels, cabling, areas for possible security breaches, and other real-world aspects associated with a data center.

The embodiments of this invention manage the physical data center from the representation in the virtual universe by obtaining a data center contextual object that describes operational information of the physical data center as it operates in the virtual universe. Data center contextual object can be obtained in a variety of ways. In one embodiment, the data center contextual object is obtained by receiving a selection made by an avatar that is online in the virtual universe and that is responsible for the physical data center, wherein the selection is made from a plurality of predefined data center contextual objects. In another embodiment, the avatar selects a data center contextual object that comprises a weighted combination of contextual objects taken from the plurality of predefined data center contextual objects. In a third embodiment, the data center contextual object is obtained by identifying a new data center context object from operational information of the data center as it operates in the virtual universe. Once the data center contextual object is obtained, at least one operational change is made to the data center as it operates in the virtual universe. This operational change is implemented as a function of the obtained data center contextual object. The operational change can take on a variety of forms. In one embodiment, the operational change comprises monitoring actions of an avatar that has a responsibility for managing the data center in the virtual universe. In another embodiment, the operational change comprises placing restrictions on allowable actions that the avatar can perform on the physical data center in the virtual universe. In a third embodiment, the operational change comprises employing a hybrid support agent (e.g., a blend of at least one software agent and at least one human agent). In another embodiment, the operational change comprises utilizing a consultant avatar (i.e., an avatar that possesses experience that is relevant to the data center contextual object) to manage the data center in the virtual universe. In a fifth embodiment, the operational change comprises providing a visualization of the data center in the virtual universe. Results obtained from implementing the at least one operational change are used manage the physical data center in the real world.

Figure 1:
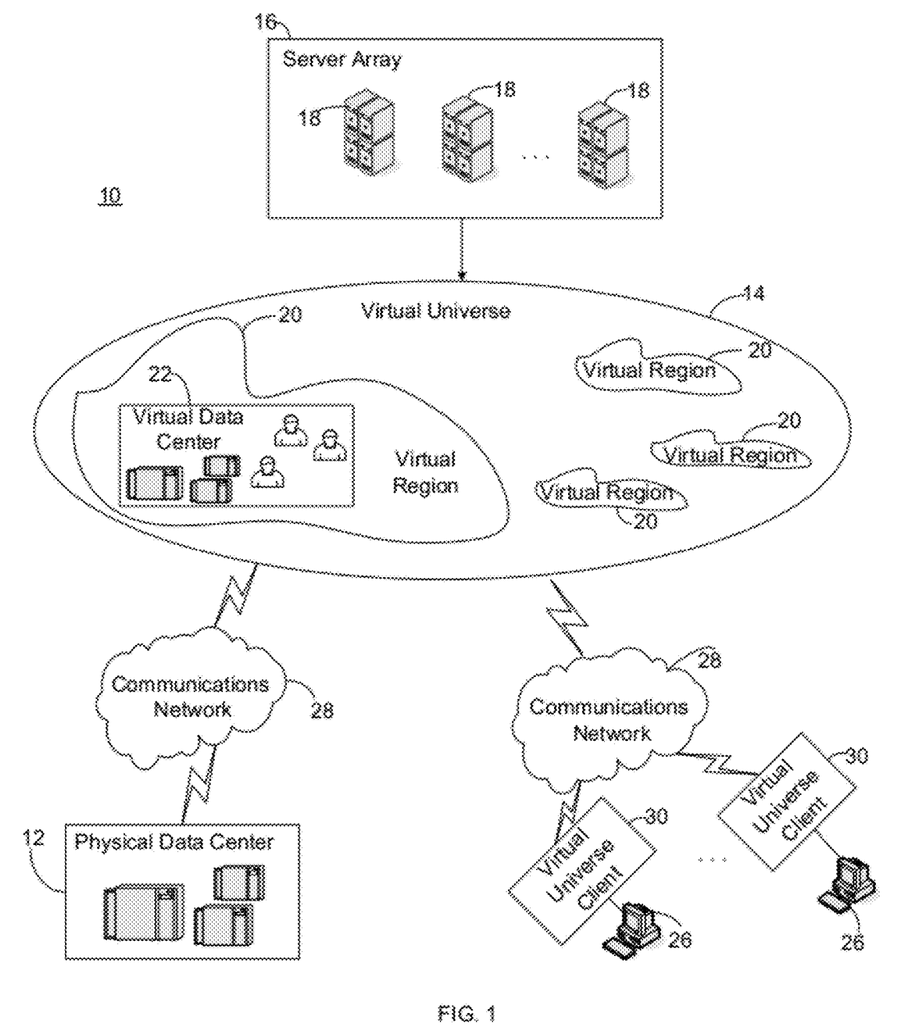
FIG. 1 shows a high-level schematic diagram showing a networking environment for managing a data center from a virtual universe using data center context according to one embodiment of this invention.

FIG. 1 shows a high-level schematic diagram showing a networking environment 10 for managing a physical data center 12 that operates in the real world from a virtual universe 14 using data center context. The physical data center 12 is generally a facility used to house computer systems and associated components, such as telecommunications and storage systems. Although not shown in FIG. 1, the data center 12 can include redundant or backup power supplies, redundant data communications connections, environmental controls (e.g., air conditioning, fire suppression), and special security devices. As shown in FIG. 1, the networking environment 10 comprises a server array or grid 16 comprising a plurality of servers 18 each responsible for managing a portion of virtual real estate within the virtual universe 14. A virtual universe provided by a typical massive multiplayer online game can employ thousands of servers to manage all of the virtual real estate. The content of the virtual real estate that is managed by each of the servers 18 within the server array 16 shows up in the virtual universe 14 as a virtual region 20.

Like the real-world, each virtual region 20 within the virtual universe 14 comprises a living landscape having things such as buildings, stores, clubs, sporting arenas, parks, beaches, cities and towns all created by residents of the universe that are represented by avatars. These examples of items are only illustrative of some things that may be found in a virtual region and are not limiting. Furthermore, the number of virtual regions 20 shown in FIG. 1 is only for illustration purposes and those skilled in the art will recognize that there may be many more regions found in a typical virtual universe.

FIG. 1 shows that one of the virtual regions 20 comprises a virtual data center 22 that is generally a three-dimensional model representation of the physical data center 12 but in an immersive environment such as the virtual universe 14. The virtual data center 22 includes representations of all of the systems and associated components that are present in the physical data center 12. Instead of having human operators working in the physical data center 12, avatars work and operate the virtual data center 22.

Figure 2:
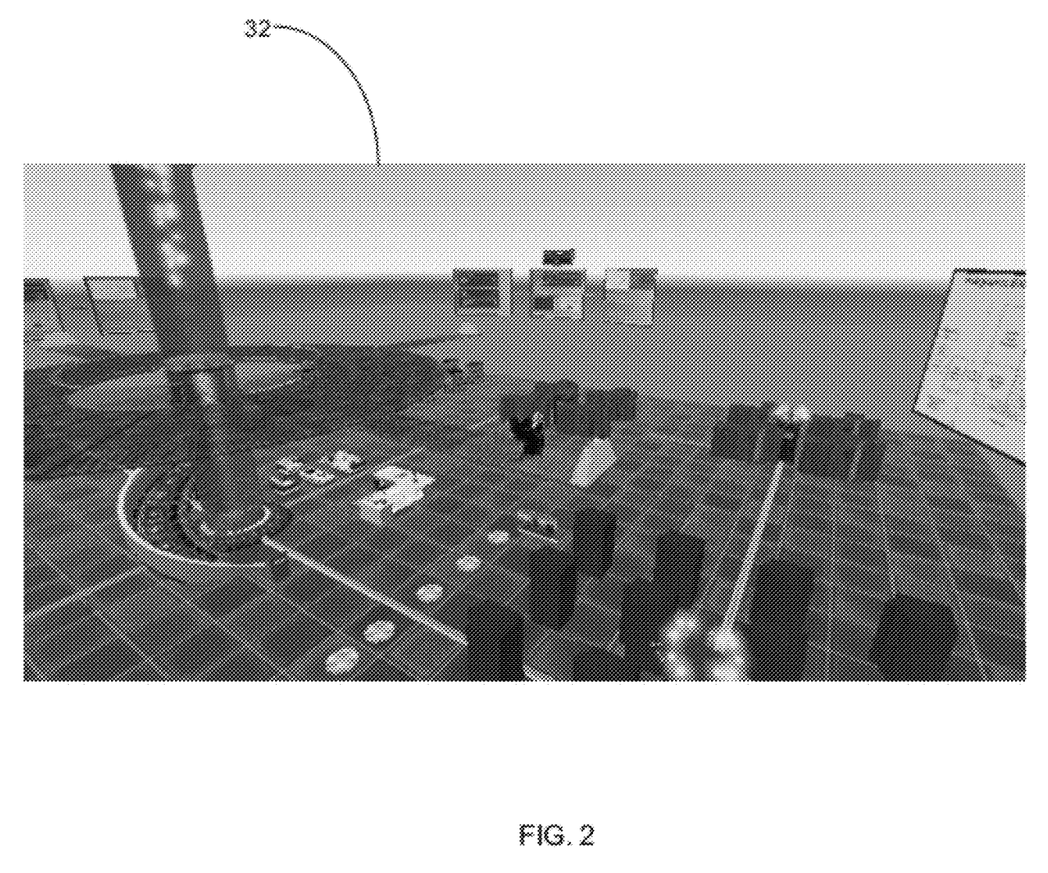
FIG. 2 provides an example of a virtual data center that may operate in the environment shown in FIG. 1.

FIG. 2 provides an example 32 of a virtual data center that may operate in the environment shown in FIG. 1. In particular, the virtual data center shown in FIG. 2 illustrates key components of the data center. For example, FIG. 2 shows screens, displays, and data towers positioned in strategic locations around the data center. The screens, displays, and data towers consume data from the virtual universe that is representative of how the physical data center will operate. Avatars responsible for managing the virtual data center will use this information to operate the virtual data center.

Referring back to FIG. 1, users operating computers 26 (i.e., within the physical data center 12 or outside) interact with the virtual universe 14 through a communication network 28 via a virtual universe client 30 that resides in the computers. In embodiments of this invention, users (e.g., operators of the virtual data center) interact with the virtual data center 22 through their avatars via the computers 26 and virtual universe clients 30.

U.S. patent application Ser. No. 11/679,384 entitled "Unsolicited Advertisements In A Virtual Universe Through Avatar Transport Offers" provides additional details of a virtual universe environment that includes the operational relationships between a virtual universe, server array, and virtual universe client.

Figure 3:
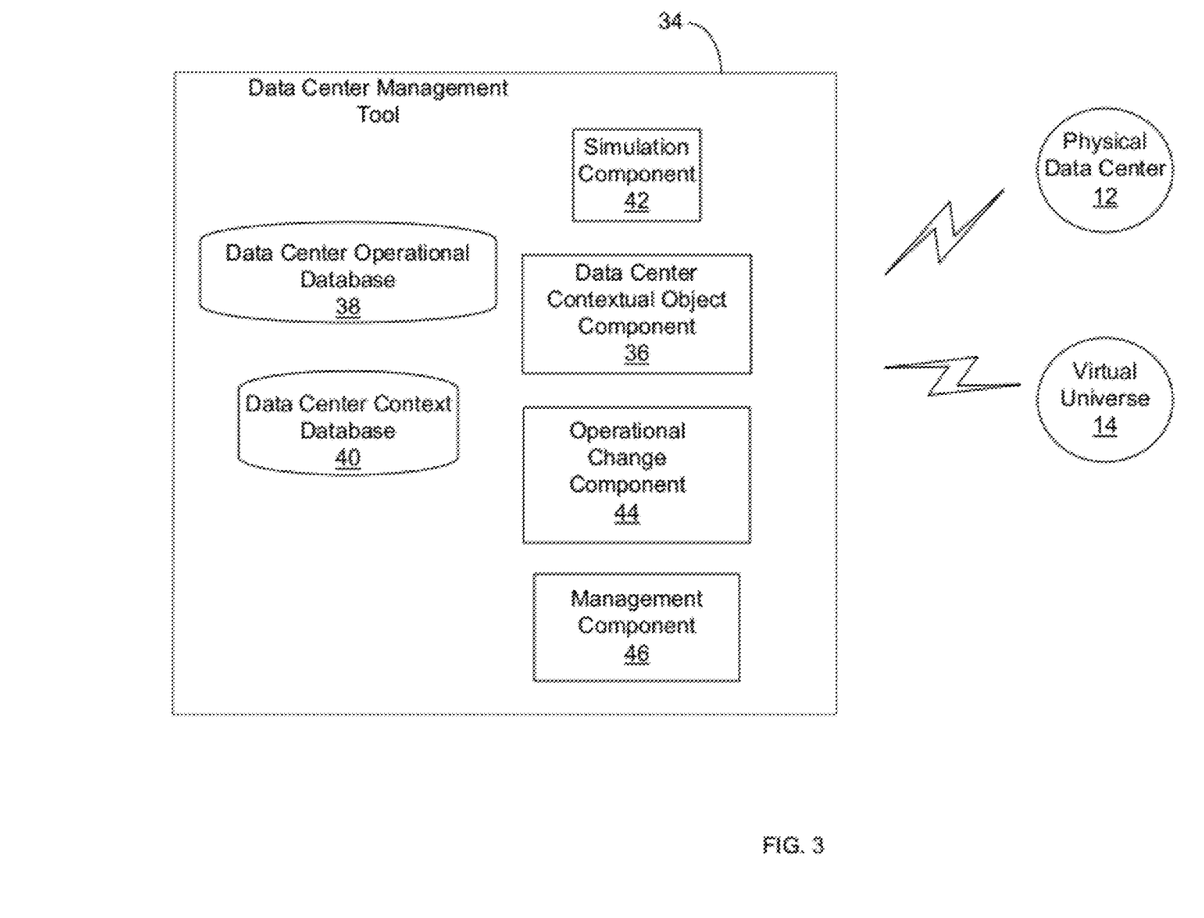
FIG. 3 shows a data center management tool according to one embodiment of this invention that operates in the environment shown in FIG. 1.

FIG. 3 shows a data center management tool 34 according to one embodiment of this invention that operates in the environment shown in FIG. 1. In one embodiment, the data center management tool 34 is used to manage the physical data center 12 that is located in the real world from a representation of the physical data center as it operates in the virtual universe 14. The data center management tool 34 comprises a data center contextual object component 36 that is configured to obtain a data center contextual object that describes operational information of the physical data center as it operates in the virtual universe. The data center contextual object comprises a broad range of attributes and respective values that are associated with a state of operation of the data center. For example, attributes of a data center contextual object might include the outbound megabits per second from network layers and requests per minute to the caching infrastructure. Combinations of values associated with these two attributes might indicate that the data center is operating in a "high load context".

The data center contextual object component 36 is configured to obtain a data center contextual object in a number of approaches. In one embodiment, the data center contextual object component 36 obtains the contextual object by receiving a selection made by an avatar that is online in the virtual universe 14 that is responsible for the virtual data center. In this embodiment, the avatar makes a selection from a plurality of predefined data center contextual objects. In one embodiment, the plurality of predefined data center contextual objects comprises contextual objects that have been previously defined that are known to represent certain operating conditions that the data center may be experiencing. For example, the predefined data center contextual objects may comprise objects such as a high load context, site failure context, and security context. A high load context indicates that the data center is operating under full capacity, site failure context indicates that the data center is experiencing a failure at a certain location, and a security context indicates that the data center is at risk (e.g., an intrusion has occurred). These examples of predefined data center contextual objects are only illustrative of some possible examples and those skilled in the art will recognize that other contextual objects can be predefined.

In another embodiment, the data center contextual object component 36 can obtain the contextual object by receiving a selection from an avatar that comprises a weighted combination of data center contextual objects selected from the plurality of predefined data center contextual objects. For example, the weighted combination may comprise a blend of 70% of the high load context and 30% of the security context.

In another embodiment, the data center contextual object component 36 can obtain the contextual object by identifying a new data center contextual object from the operational information of the virtual data center. A new data center contextual object can be obtained in a variety of ways. For example, in one embodiment, the data center contextual object component 36 can identify the new data center contextual object by observing actions of the avatars operating in the data center and classifying the actions according to categories that could drive such actions such as market forces, voting, or an auction.

In another embodiment, machine learning techniques can be used to generate the new data center contextual object. For example, well-known unsupervised and supervised machine learning techniques can be used to identify the new data center contextual objects. Examples of machine learning techniques are set forth in U.S. Pat. No. 6,701,311 entitled "Customer Self Service System for Resource Search and Selection"; U.S. Pat. No. 6,778,193 entitled "Customer Self Service Iconic Interface for Portal Entry and Search Specification"; U.S. Pat. No. 6,853,998 entitled "Customer Self Service Subsystem for Classifying User Contexts"; U.S. Pat. No. 6,643,639 entitled "Customer Self Service Subsystem for Adaptive Indexing of Resource Solutions and Resource Lookup"; U.S. Pat. No. 6,785,676 entitled "Customer Self Service Subsystem for Response Set Ordering and Annotation"; U.S. Pat. No. 6,693,651 entitled "Customer Self Service Iconic Interface for Resource Search Results Display and Selection"; and U.S. Pat. No. 6,873,990 entitled "Customer Self Service Subsystem for Context Cluster Discovery and Validation", which are all incorporated by reference in their entirety.

Data center operational database 38 and data center context database 40 can be used to facilitate the identification of new data center contextual objects. The data center operational database 38 can store other general and private information on the data center such as components, operating specifications, rules for operation, fault conditions, etc. Furthermore, the data center operational database 38 can store information that is specific to the interacting environment. For example, the database 38 can store information such as all of the avatars that have authority to operate the data center and their scope of responsibility, the profile of each avatar, avatar characteristics, etc. The data center context database 40 contains general and historical data center context data for the data center. In one embodiment, the general and historical data center context data contains information describing attributes that are relevant to the operation of the data center and the behavioral needs of the avatars operating the data center and can include a wide range of other attributes. This type of information can be acquired using conventional data acquisition techniques and assessed for data center context by using teachings from the machine learning techniques listed above. Those skilled in the art will recognize that databases 38 and 40 may contain additional information if desired.

A simulation component 42 is configured to simulate operation of the physical data center in the virtual universe as a function of the new data center contextual objects or the blended selection of the predefined contextual objects. In particular, a simulation will evaluate the efficiency of using the new data center contextual objects or the blended selection of the predefined contextual objects. Details for running simulations of data centers within a virtual environment are disclosed in U.S. patent application Ser. No. 11/747,122 entitled "Simulation Management Within A Grid Infrastructure," which is incorporated by reference in its entirety.

As shown in FIG. 3, the data center management tool 34 further comprises an operational change component 44 that is configured to implement at least one operational change to the representation of the physical data center in the virtual universe. In particular, the at least one operational change is implemented as a function of the data center contextual object. The at least one operational change can take on a variety of forms. In one embodiment, the change implemented by the operational change component 44 comprises monitoring actions of an avatar that is responsible for managing the physical data center. In particular, the actions of the avatar are monitored to ensure that his or her actions are consistent with the data center contextual object that the data center is in. In another embodiment, the change implemented by the operational change component 44 comprises placing restrictions on allowable actions that the avatar(s) in the virtual universe data center can perform while working, operating, and/or controlling the data center. In a third embodiment, the change implemented by the operational change component 44 comprises employing a hybrid support agent to manage the virtual universe data center. In this embodiment the hybrid support agent comprises a blend of at least one software agent and at least one human agent. The result of this hybrid support agent would generally take the form of a single operator avatar shown in the virtual universe. In a fourth embodiment, the change implemented by the operational change component 44 comprises utilizing a consultant avatar to manage the virtual universe data center, wherein the consultant avatar possesses experience that is relevant to the data center contextual object. In one embodiment, the consultant avatar can be teleported from an entirely different location than where the virtual universe data center is currently located. In another embodiment, the change implemented by the operational change component 44 comprises providing a visualization of the virtual universe data center. In one embodiment, the visualization comprises a depiction of attributes of the data center contextual object. Below are more details and examples of these types of changes that can be implemented by the operational change component 44.

FIG. 3 shows that the data center management tool 34 further comprises a management component 46 that is configured to manage the physical data center 12 in the real world pursuant to results obtained from implementing the at least one operational change the data center in the virtual universe 14. Additional details of managing a physical data center from a virtual universe are set forth in U.S. patent application Ser. No. 11/747,157 entitled "Virtual Network Operations Center", which is incorporated by reference in its entirety.

In operation, the data center management tool 34 may reside on the same computer system as the server 16 and communicates directly to the virtual universe and its residents via the virtual universe client 30 and directly to the physical data center 12. In other embodiments, the data center management tool 34 might reside on the same computers as the virtual universe client 30, or reside on separate computers in direct communication with the virtual universe servers 18 and virtual universe clients 30. For example, the data center management tool 34 might reside on separate computers provided by a third party such as a service to the owner of the physical data center or the virtual universe provider.

Figure 4:
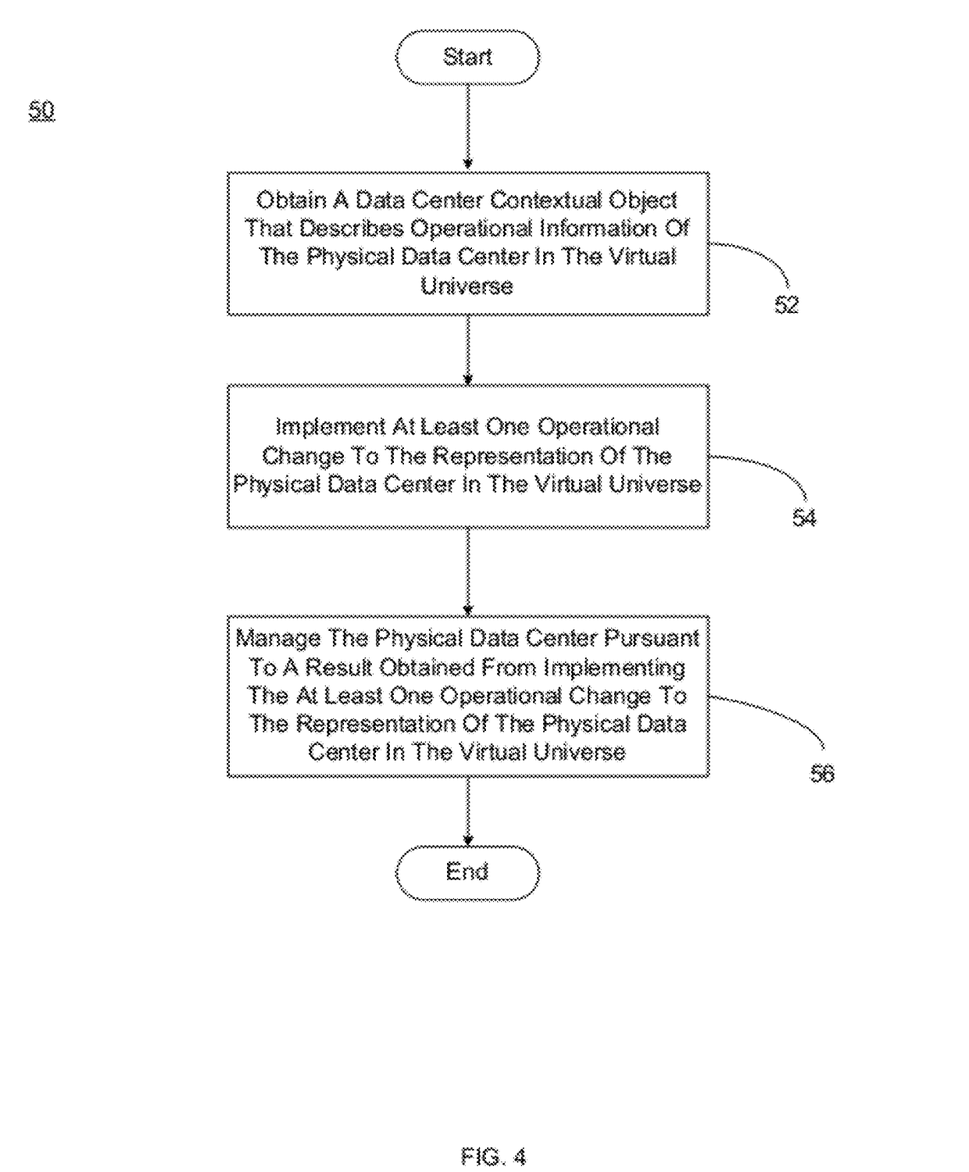
FIG. 4 shows a flow chart describing the general operations performed by the data center management tool shown in FIG. 3.

FIG. 4 shows a flow chart 50 describing the general operations performed by the data center management tool 34 which have been described above. In FIG. 4, flow chart 50 begins at 52 by obtaining a data center contextual object that describes operational information of the physical data center in the virtual universe. In one embodiment, the obtaining of the data center contextual object comprises receiving a selection made by an avatar online in the virtual universe that is responsible for the physical data center, wherein the avatar selection is made from a plurality of predefined data center contextual objects. In another embodiment, the obtaining of the data center contextual object comprises identifying a new data center contextual object from the operational information. In this embodiment, the identifying of the new data center contextual object comprises using unsupervised and supervised machine learning techniques to identify the new data center contextual object. In another embodiment, the identifying of the new data center contextual object comprises observing actions of an avatar online in the virtual universe that is responsible for the physical data center and classifying the actions according to one of market forces, voting, or an auction.

Referring back to FIG. 4, at least one operational change is implemented to the representation of the physical data center in the virtual universe at 54, wherein the at least one operational change is implemented as a function of the data center contextual object. In one embodiment, the implementing of the at least one operational change comprises monitoring actions of an avatar online in the virtual universe that is responsible for the physical data center, wherein the monitoring comprises ensuring that the actions are consistent with the data center contextual object. In another embodiment, the implementing of the at least one operational change comprises placing restrictions on allowable actions that an avatar online in the virtual universe can perform on the representation of the physical data center in the virtual universe. In another embodiment, the implementing of the at least one operational change comprises employing a hybrid support agent to manage the physical data center through the representation of the physical data center in the virtual universe, wherein the hybrid support agent comprises a blend of at least one software agent and at least one human agent that takes the form of a single operator avatar. In still another embodiment, the implementing of the at least one operational change comprises utilizing a consultant avatar to manage the physical data center through the representation of the physical data center in the virtual universe, wherein the consultant avatar possesses experience that is relevant to the data center contextual object. In another embodiment, the implementing of the at least one operational change comprises providing a visualization of the physical data center through the representation of the physical data center in the virtual universe, wherein the visualization comprises a depiction of the data center contextual object in the form of at least one attribute and value associated therewith.

Referring again to FIG. 4, the physical data center is then managed at 56 pursuant to a result obtained from implementing the at least one operational change to the representation of the physical data center in the virtual universe.

The foregoing flow chart shows some of the functions associated with the general operations performed by the data center management tool 34. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

As mentioned above, the predefined data center contextual objects may comprise objects such as a high load context, site failure context, and security context. Below are examples of possible scenarios for a data center which could be replicated with a virtual universe data center, methods of discovering the context and actions to take that are based on the discovered context. These examples are only illustrative of possible scenarios and are not meant to be limiting.

One particular scenario that is illustrative of a possible high load context would occur during a major event such as the Wimbledon tennis championships. It is anticipated that during the Wimbledon championships a particular infrastructure that handles information for the event will be under its peak load for the event. One way to discover the context would be to measure outbound megabits per second from network layers and requests per minute to the caching infrastructure. This data constitutes some of the attribute value pairs which define the high load context. A context based action that could be taken during such a high load event would be to prevent support avatars, which would normally interact with a virtual universe version of the computing center, from performing maintenance tasks. For example, updating firewall rules is restricted, rebooting routers is forbidden, etc. Optionally, one could restrict the number and nature of teleports to and from the computing center. Also note that by reducing the number of avatars, less load is placed on the virtual universe infrastructure. A support avatar may then be prevented from performing a task. For example, an avatar attempting to select a button on a computing device may be prevented from doing so.

One particular scenario that is illustrative of a possible site failure context would occur when one of three hosting centers is currently offline due to network failure. This context would be discovered because the site is unreachable from other data centers or an external monitoring service would indicate that the hosting site is globally unreachable. Service failure is predicted to occur due to load if another hosting site has a failure. Therefore, one context action that could be taken is to have all avatars below a certain band (e.g. job category) or skill level locked out from the virtual data center. For example, if a support company has global resources of a lower band, they would be automatically locked out of the virtual universe data center during such a time, and only senior engineers would be able to perform actions within the data center. Another action would be to optionally restrict the number and nature of teleports to and from the computing center. Also note that by selecting only certain avatars for entrance into the data center, less load is placed on the virtual universe infrastructure. Additionally, the avatars that are present may be better able to complete their missions given the avatar restrictions. One way to restrict the nature and number of teleports is for avatars to have an associated tag or token that specifies their job category and seniority. Then the token can be queried, and based on a policy table, one could either permit or reject an attempted entrance into the data center.

A particular scenario that is illustrative of a possible security context could occur during a site intrusion. In this example, well known intrusion detection software could be used to detect the intrusion. A possible context based action to take could include automatic teleportation of security team members into the virtual data center to begin analyzing the attack. Optionally, one could restrict the number and nature of teleports to and from the computing center. One way to restrict the nature and number of teleports is for avatars to have an associated tag or token that specifies their job category and seniority. The system queries this token and based on a policy table either permits or rejects an attempted entrance into the data center.

Below are examples of how the data center management tool 34 could be used to identify new data center contextual objects. These examples are only illustrative of possible scenarios and are not meant to be limiting.

As mentioned above, market forces scenario is one possible area that can be used to identify new data center contextual objects. As an example, the increased emphasis on energy efficiency due to the costs of power for data centers could be implemented by identifying a new data center context—"energy efficiency context". In this example, a combination of attribute-value pairs related to power cost, available supply and power consumption by a data center would result in the data center operation coming under control of this context. For example, depending upon market forces context, a support avatar may not be permitted to alter parameters and controls in a virtual universe data center that would lead to increased energy use. Such a context may be implemented when a change, such as bringing another server on-line for a web service, may increase energy consumption but only decrease user wait time by a small margin.

Analytics as used by machine learning techniques could be used to identify new data center contextual objects. For example, unsupervised machine learning techniques could be used with previously executed operator actions to identify a new data center context, "data throughput", in which the goal is to process as much data as possible. The data center management tool could then make "data throughput" the default context unless the attribute value pairs being monitored determined that the data center should be operated according to a security or site failure context. As an example, consider the case of a security alert, intrusion, terrorism, or power overload. In these cases, it may be useful to reduce data throughput as support avatars study, diagnose, and act upon such threats. If large amounts of personal data are being transferred and/or studied by a hacker, it may be useful to reduce throughput to such potentially risky channels as actions are monitored and studied.

As mentioned above, several possible actions that could be implemented as a function of the data center contextual object include monitoring actions of an avatar that is responsible for managing the physical data center, placing restrictions on allowable actions that the avatar can perform while working in the data center, employing a hybrid support agent to manage the virtual universe data center, utilizing a consultant avatar to manage the virtual universe data center and providing a visualization of the virtual universe data center. Below are examples of each of these possible actions. These examples are only illustrative of possible actions and are not meant to be limiting.

Various actions performed by the avatar operator may be monitored such as executed commands, gestures, etc., and compared to actions that are deemed suitable by the data management center tool 34 for the applicable contextual object. If the avatar actions are not consistent with expected actions, the data management center tool 34 could remind the avatar operator of the expected actions or direct them to a database containing the expected actions and/or notify their supervisors. Additional details of monitoring avatar operator actions are set forth in U.S. Pat. No. 6,711,699 entitled "Real Time Backup System for Information Based on a User's Actions and Gestures for Computer Users", which is incorporated by reference in its entirety.

For an example of placing restrictions on allowable avatar actions, consider the example of a "site failure context" (e.g., one of three related data centers goes down). In this scenario, low level avatars (e.g., below a certain skill rating) could be immediately locked out of the data center. Only senior engineers would be able to perform certain actions and certain other actions would be prohibited regardless of the skill rating of the avatar. In situations of "site failure context", the maximum number of avatars could be limited to avoid overloading the infrastructure.

A hybrid support agent as mentioned above, is generally a blend of software agents (S) and human agents (H) in a single support avatar. The ratio of S/H may be determined automatically as a function of context or pricing. For example, a more critical problem may decrease the S/H ratio, as would a customer who is paying more for the service. A hybrid avatar typically includes a user-driven avatar interacting with a software component that gives the avatar advice, answers questions, offers guidance, and can prevent the human component of the avatar from performing a risky action. For example, the human component may be about to flick a virtual switch that accidentally turns off a crucial system. The software component may prevent him from doing this and/or offer a warning. The software component may also assist in tasks by performing them more quickly or with more manual dexterity than would be conveniently available to a standard avatar. The phrase "S/H ratio" may refer to the amount of authority or power the software component may have. A high S/H ratio, for example, may imply that the software component has authority to override human actions, offer more frequent guidance, and have access to more computational cycles, more simulation engines, and more databases.

Adjusting the S/H percent composition of avatar operators based on the context can be advantageous to the management of the virtual data center. For example, by increasing the S/H ratio of avatars below a certain skill rating, the tool 34 can respond to a change in data center context with greater granularity rather than having to lock out certain lower skilled human operators entirely and having to incur the expense of teleporting in higher skilled and more expensive human operators.

The adjustment of the S/H ratio can be implemented to specify a minimum default S/H ratio for each possible data center context based on how much the customer is willing to pay, following an assessment of the cost of an operator mistake in various data center context scenarios. As an example, a human operator and a software agent may both have control over a single avatar. If the human avatar attempts to perform an action deemed inappropriate, deleterious, or dangerous, the software agent can "take over" to prevent the act and/or offer guidance. The software agent may also assist with operations that require manual dexterity or speed not possible for the human operator. Conversations (audio or text) may take place between the agent and human that compose the hybrid.

Utilizing a consultant avatar to manage the virtual universe data center could occur in a variety of scenarios. For example, a site incursion could place the data center in a "security" context which could be ameliorated by using a consultant avatar that has specialized experience in dealing with site incursions. If a highly skilled operator was required, then they could be located and teleported to the data center to deal with the issues resulting from the new context.

There are several alternative means for visualizing changes in attributes and values associated with data center contexts. In one embodiment, it is possible to present various forms of graphic user interfaces so as to enable avatar operators to select the visualization system most comfortable for them. After making these selections, it then would be possible to utilize icons and sliders to manipulate the visualization of various attributes and respective values that are indicative of the data center. Additional details for providing visualization techniques are set forth in U.S. patent application Ser. No. 11/747,058 entitled "Visualization Of Information Using Landmasses" and U.S. patent application Ser. No. 11/747,088 entitled "Masking Changes To A Computer Application", which is incorporated by reference in its entirety. Also, details of graphical user interfaces for such visualization systems are set forth in U.S. Pat. No. 6,778,193 entitled "Customer Self Service Iconic Interface for Portal Entry and Search Specification" and U.S. Pat. No. 6,693,651 entitled "Customer Self Service Iconic Interface for Resource Search Results Display and Selection", which are both incorporated by reference in their entirety.

In other embodiments of this invention, the data center management tool 34 might be used as a service to charge fees for each time that the tool is invoked. In this embodiment, the provider of the virtual universes or third party service providers could offer this tool as a service by performing the functionalities described herein on a subscription and/or fee basis. In this case, the provider of the virtual universes or third party service providers can create, deploy, maintain, support, etc., the data center management tool 34 that performs the processes described in the embodiments of the invention. In return, the virtual universes or the third party service provider can receive payment from the users or owners of physical data centers.

In still another embodiment, the methodologies disclosed herein can be used within a computer system to provide management of a physical data center from a virtual data center. In this case, the data center management tool 34 can be provided and one or more systems for performing the processes described in the invention can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of embodiments of the invention.

Figure 5:
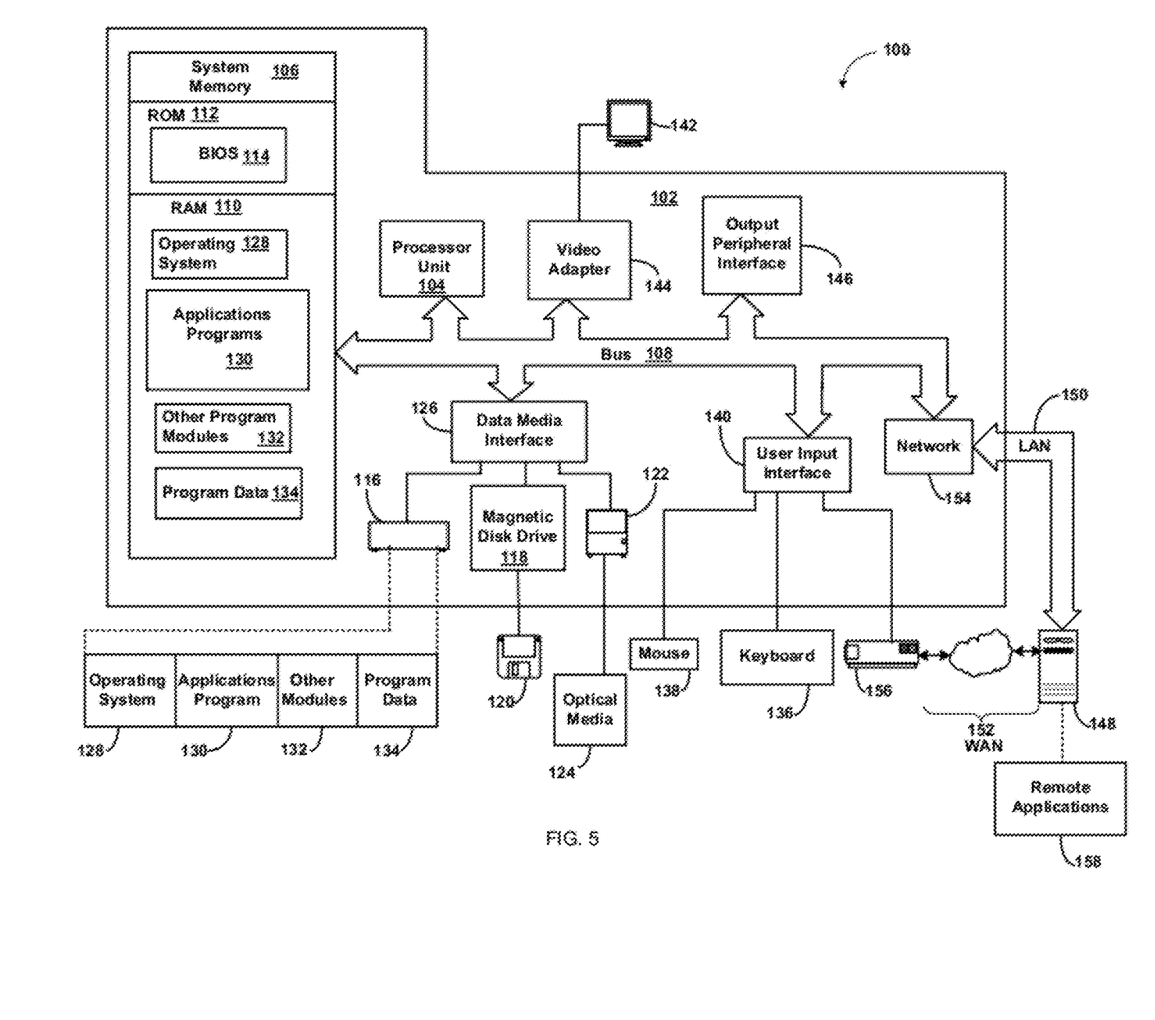
FIG. 5 shows a schematic of an exemplary computing environment in which elements of the networking environment shown in FIG. 1 may operate.

FIG. 5 shows a schematic of an exemplary computing environment 100 in which elements of the networking environment shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency requirement relating to any one or combination of components illustrated in FIG. 5.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers (PC), server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112.

RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the networking environment 10 of FIG. 1 including the server array 14, the virtual universe client 24 and the data center management shown in FIG. 3. In one embodiment, data center management tool 34 (FIG. 3) may be implemented utilizing computer 102. In this embodiment, one or more application programs 130 may comprise data center management tool 34; other program modules 132 may comprise data center contextual object component 36, simulation component 42, operational change component 44, and management component 46; and program data 134 may comprise data center operational database 38 and data center context database 40.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable media containing computer instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this invention an approach for data center management from a virtual universe using data center context. While the invention has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for managing a physical data center housing computer systems and associated components from a three-dimensional model representation of the computer systems and associated components of the physical data center that operates within a virtual universe, comprising:

obtaining a data center contextual object in the virtual universe that describes operational information of the computer systems and associated components that operate within the physical data center, the data center contextual object having a range of attributes and respective values that are associated with a state of operation of the physical data center, wherein the obtaining of the data center contextual object comprises receiving a selection made by an avatar online in the virtual universe that is responsible for the physical data center, wherein the avatar selection is made from a plurality of predefined data center contextual objects each describing operational information of the computer systems and associated components that operate within the physical data center and having a range of attributes and respective values that are associated with the state of operation of the physical data center, wherein the avatar selection comprises a weighted combination of data center contextual objects selected from the plurality of predefined data center contextual objects, wherein the weighted combination of data center contextual objects comprises a blend of the attributes and respective values of more than one of the plurality of predefined data center contextual objects;

implementing at least one operational change to the three-dimensional model representation of the computer systems and associated components of the physical data center in the virtual universe, wherein the at least one operational change is implemented as a function of the data center contextual object; and managing the computer systems and associated components that operate within the physical data center pursuant to a result obtained from implementing the at least one operational change to the three-dimensional model representation of the computer systems and associated components of the physical data center in the virtual universe.

2. The method according to claim 1, wherein the plurality of predefined data center contextual objects comprises one of high load context, site failure context, and security context.

3. The method according to claim 1, wherein the obtaining of the data center contextual object comprises identifying a new data center contextual object from the operational information.

4. The method according to claim 3, wherein the identifying of the new data center contextual object comprises using unsupervised and supervised machine learning techniques to identify the new data center contextual object.

5. The method according to claim 3, wherein the identifying of the new data center contextual object comprises observing actions of an avatar online in the virtual universe that is responsible for the physical data center and classifying the actions according to one of market forces, voting, or an auction.

6. The method according to claim 1, further comprising simulating operation of the physical data center in the virtual universe as a function of the data center contextual object.

7. The method according to claim 1, wherein the implementing of the at least one operational change comprises monitoring actions of an avatar online in the virtual universe that is responsible for the physical data center, wherein the monitoring comprises ensuring that the actions are consistent with the data center contextual object.

8. The method according to claim 1, wherein the implementing of the at least one operational change comprises placing restrictions on allowable actions that an avatar online in the virtual universe can perform on the representation of the physical data center in the virtual universe.

9. The method according to claim 1, wherein the implementing of the at least one operational change comprises employing a hybrid support agent to manage the physical data center through the representation of the physical data center in the virtual universe, wherein the hybrid support agent comprises a blend of at least one software agent and at least one human agent that takes the form of a single operator avatar.

10. The method according to claim 1, wherein the implementing of the at least one operational change comprises utilizing a consultant avatar to manage the physical data center through the representation of the physical data center in the virtual universe, wherein the consultant avatar possesses experience that is relevant to the data center contextual object.

11. The method according to claim 1, wherein the implementing of the at least one operational change comprises providing a visualization of the physical data center through the representation of the physical data center in the virtual universe, wherein the visualization comprises a depiction of the data center contextual object in the form of at least one attribute and value associated therewith.

12. A computer system for managing a physical data center housing computer systems and associated components from a three-dimensional model representation of the computer systems and associated components of the physical data center that operates within a virtual universe, comprising:

at least one processing unit;

memory operably associated with the at least one processing unit; and a data center management tool storable in memory and executable by the at least one processing unit, the tool comprising:

a data center contextual object component configured to obtain a data center contextual object in the virtual universe that describes operational information of the computer systems and associated components that operate within the physical data center, the data center contextual object having a range of attributes and respective values that are associated with a state of operation of the physical data center, wherein the data center contextual object component is configured to receive a selection made by an avatar online in the virtual universe that is responsible for the physical data center, wherein the avatar selection is made from a plurality of predefined data center contextual objects each describing operational information of the computer systems and associated components that operate within the physical data center and having a range of attributes and respective values that are associated with the state of operation of the physical data center, wherein the avatar selection comprises a weighted combination of data center contextual objects selected from the plurality of predefined data center contextual objects, wherein the weighted combination of data center contextual objects comprises a blend of the attributes and respective values of more than one of the plurality of predefined data center contextual objects;

an operational change component configured to implement at least one operational change to the three-dimensional model representation of the computer systems and associated components of the physical data center in the virtual universe, wherein the at least one operational change is implemented as a function of the data center contextual object; and a management component configured to manage the computer systems and associated components that operate within the physical data center pursuant to a result obtained from implementing the at least one operational change to the three-dimensional model representation of the computer systems and associated components of the physical data center in the virtual universe.

13. The computer system according to claim 12, wherein the data center contextual object component is configured to identify a new data center contextual object from the operational information.

14. The computer system according to claim 12, further comprising a simulation component configured to simulate operation of the physical data center in the virtual universe as a function of the data center contextual object.

15. The computer system according to claim 12, wherein the at least one operational change is selected from the group consisting of monitoring actions of an avatar online in the virtual universe that is responsible for the physical data center, placing restrictions on allowable actions that the avatar can perform on the representation of the physical data center in the virtual universe, employing a hybrid support agent to manage the physical data center through the representation of the physical data center in the virtual universe, utilizing a consultant avatar to manage the physical data center through the representation of the physical data center in the virtual universe and providing a visualization of the data center contextual object as represented in the virtual universe.

16. A non-transitory computer-readable medium storing computer instructions, which when executed, enables a computer system to manage a physical data center housing computer systems and associated components from a three-dimensional model representation of the computer systems and associated components of the physical data center that operates within a virtual universe, the computer instructions comprising:

obtaining a data center contextual object in the virtual universe that describes operational information of the computer systems and associated components that operate within the physical data center, the data center contextual object having a range of attributes and respective values that are associated with a state of operation of the physical data center, wherein the obtaining of the data center contextual object comprises receiving a selection made by an avatar online in the virtual universe that is responsible for the physical data center, wherein the avatar selection is made from a plurality of predefined data center contextual objects each describing operational information of the computer systems and associated components that operate within the physical data center and having a range of attributes and respective values that are associated with the state of operation of the physical data center, wherein the avatar selection comprises a weighted combination of data center contextual objects selected from the plurality of predefined data center contextual objects, wherein the weighted combination of data center contextual objects comprises a blend of the attributes and respective values of more than one of the plurality of predefined data center contextual objects;

implementing at least one operational change to the three-dimensional model representation of the computer systems and associated components of the physical data center in the virtual universe, wherein the at least one operational change is implemented as a function of the data center contextual object; and managing the computer systems and associated components that operate within the physical data center pursuant to a result obtained from implementing the at least one operational change to the three-dimensional model representation of the computer systems and associated components of the physical data center in the virtual universe.

17. The non-transitory computer-readable medium according to claim 16, wherein the obtaining of the data center contextual object further comprises identifying a new data center contextual object from the operational information.

18. The non-transitory computer-readable medium according to claim 17, further comprising simulating operation of the physical data center in the virtual universe as a function of the data center contextual object.

19. The non-transitory computer-readable medium according to claim 16, wherein the at least one operational change is selected from the group consisting of monitoring actions of an avatar online in the virtual universe that is responsible for the physical data center, placing restrictions on allowable actions that the avatar can perform on the representation of the physical data center in the virtual universe, employing a hybrid support agent to manage the physical data center through the representation of the physical data center in the virtual universe, utilizing a consultant avatar to manage the physical data center through the representation of the physical data center in the virtual universe and providing a visualization of the data center contextual object as represented in the virtual universe.

20. A method for providing a data center management tool as a service within a virtual universe for facilitating management of a physical data center housing computer systems and associated components from a three-dimensional model representation of the computer systems and associated components of the physical data center that operates within the virtual universe, comprising:

deploying the data center management tool in a computer system as a service for facilitating management of the physical data center from the virtual universe, wherein the data center management tool is operable to:

obtain a data center contextual object in the virtual universe that describes operational information of the computer systems and associated components that operate within the physical data center, the data center contextual object having a range of attributes and respective values that are associated with a state of operation of the physical data center, wherein the obtaining of the data center contextual object comprises receiving a selection made by an avatar online in the virtual universe that is responsible for the physical data center, wherein the avatar selection is made from a plurality of predefined data center contextual objects each describing operational information of the computer systems and associated components that operate within the physical data center and having a range of attributes and respective values that are associated with the state of operation of the physical data center, wherein the avatar selection comprises a weighted combination of data center contextual objects selected from the plurality of predefined data center contextual objects, wherein the weighted combination of data center contextual objects comprises a blend of the attributes and respective values of more than one of the plurality of predefined data center contextual objects;

implement at least one operational change to the three-dimensional model representation of the computer systems and associated components of the physical data center in the virtual universe, wherein the at least one operational change is implemented as a function of the data center contextual object;

manage the computer systems and associated components that operate within the physical data center pursuant to a result obtained from implementing the at least one operational change to the three-dimensional model representation of the computer systems and associated components of the physical data center in the virtual universe; and charge a management fee to an owner of the physical data center.

21. A method for deploying a data center management tool for use in a computer system that manages a physical data housing computer systems and associated components center from a three-dimensional model representation of the physical data center that operates within a virtual universe, comprising:

providing a computer infrastructure operable to:

obtain a data center contextual object in the virtual universe that describes operational information of the computer systems and associated components that operate within the physical data center, the data center contextual object having a range of attributes and respective values that are associated with a state of operation of the physical data center, wherein the obtaining of the data center contextual object comprises receiving a selection made by an avatar online in the virtual universe that is responsible for the physical data center, wherein the avatar selection is made from a plurality of predefined data center contextual objects each describing operational information of the computer systems and associated components that operate within the physical data center and having a range of attributes and respective values that are associated with the state of operation of the physical data center, wherein the avatar selection comprises a weighted combination of data center contextual objects selected from the plurality of predefined data center contextual objects, wherein the weighted combination of data center contextual objects comprises a blend of the attributes and respective values of more than one of the plurality of predefined data center contextual objects;

implement at least one operational change to the three-dimensional model representation of the computer systems and associated components of the physical data center in the virtual universe, wherein the at least one operational change is implemented as a function of the data center contextual object; and manage the computer systems and associated components that operate within the physical data center pursuant to a result obtained from implementing the at least one operational change to the three-dimensional model representation of the computer systems and associated components of the physical data center in the virtual universe.

\* \* \* \* \*